US009817915B2

United States Patent
Robert et al.

(10) Patent No.: US 9,817,915 B2
(45) Date of Patent: *Nov. 14, 2017

(54) SYSTEM AND METHOD ENABLING VISUAL FILTERING OF CONTENT

(71) Applicant: Disney Enterprises, Inc., Burbank, CA (US)

(72) Inventors: Arnaud Robert, Simi Valley, CA (US); Edward C. Drake, Stevenson Ranch, CA (US); William Bartley, Venice, CA (US)

(73) Assignee: Disney Enterprises, Inc., Burbank, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 14/869,728

(22) Filed: Sep. 29, 2015

(65) Prior Publication Data

US 2016/0019311 A1  Jan. 21, 2016

Related U.S. Application Data

(63) Continuation of application No. 12/931,702, filed on Feb. 7, 2011, now Pat. No. 9,185,326.

(Continued)

(51) Int. Cl.
*G06F 3/048* (2013.01)
*G06F 17/30* (2006.01)
(Continued)

(52) U.S. Cl.
CPC .... *G06F 17/30902* (2013.01); *G06F 3/04842* (2013.01); *G06F 17/3089* (2013.01);
(Continued)

(58) Field of Classification Search
CPC .............. G06F 17/30058; G06F 17/30; G06F 17/3002; G06F 17/30053; G06F 17/30244;
(Continued)

(56) References Cited

U.S. PATENT DOCUMENTS 7,930,347 B2 * 4/2011 Maxwell ........... G06F 17/30017
709/202
2006/0047580 A1 * 3/2006 Saha ................. G06F 17/30746
705/26.62

(Continued)

OTHER PUBLICATIONS

Holm et al., Associating Avatar with Musical Genres; © 2010; IEEE; 8 pages.*

*Primary Examiner* — Linh K Pham
(74) *Attorney, Agent, or Firm* — Farjami & Farjami LLP

(57) ABSTRACT

There is presented a system and method enabling visual filtering of content. The system comprises a server, a content database storing content units and accessible through the server, and a filtering and display application. The filtering and display application is configured to enable visual filtering of the content units by filtering a plurality of graphical representations corresponding to a plurality of content units stored by the system, to extract a first plurality of graphical representations for displaying to a user, displaying the first plurality of graphical representations as active graphical representations selectable by the user in a first featured display, and dynamically filtering the first plurality of graphical representations and replacing the first featured display with another featured display of a first subset of active graphical representations selectable by the user according to an input received from the user.

18 Claims, 8 Drawing Sheets

Related U.S. Application Data

(60) Provisional application No. 61/397,455, filed on Jun. 11, 2010.

(51) Int. Cl.

| | | |
|---|---|---|
| *G06F 21/10* | (2013.01) | |
| *H04N 5/445* | (2011.01) | |
| *H04N 21/431* | (2011.01) | |
| *H04N 21/45* | (2011.01) | |
| *H04N 21/454* | (2011.01) | |
| *H04N 21/475* | (2011.01) | |
| *H04N 21/4782* | (2011.01) | |
| *H04N 21/81* | (2011.01) | |
| *H04N 21/84* | (2011.01) | |
| *G06F 3/0484* | (2013.01) | |

(52) U.S. Cl.
CPC ........ *G06F 17/30849* (2013.01); *G06F 21/10* (2013.01); *H04N 5/445* (2013.01); *H04N 21/431* (2013.01); *H04N 21/454* (2013.01); *H04N 21/4532* (2013.01); *H04N 21/4755* (2013.01); *H04N 21/4782* (2013.01); *H04N 21/8146* (2013.01); *H04N 21/84* (2013.01)

(58) Field of Classification Search
CPC ......... G06F 17/30554; G06F 17/30775; G06F 17/30749; G06F 3/0482
See application file for complete search history.

(56) References Cited

U.S. PATENT DOCUMENTS

| | | | | |
|---|---|---|---|---|
| 2006/0150215 A1* | 7/2006 | Wroblewski | .......... | G06F 3/0236 725/47 |
| 2006/0215220 A1* | 9/2006 | Yamahara | .......... | G06F 17/30053 358/1.15 |
| 2006/0217828 A1* | 9/2006 | Hicken | ............ | G06F 17/30743 700/94 |
| 2006/0259852 A1* | 11/2006 | Upendran | ........ | G06F 17/30873 715/234 |
| 2008/0216106 A1* | 9/2008 | Maxwell | ........... | G06F 17/30017 725/1 |
| 2010/0013780 A1* | 1/2010 | Ikeda | .................. | G06F 3/04883 345/173 |
| 2010/0114857 A1* | 5/2010 | Edwards | ........... | G06F 17/30817 707/709 |
| 2010/0146077 A1* | 6/2010 | Davies | ............. | G06F 17/30817 709/219 |
| 2010/0175022 A1* | 7/2010 | Diehl | .................... | G06F 3/0481 715/784 |
| 2010/0223356 A1* | 9/2010 | Scott | ................. | H04M 1/72561 709/218 |
| 2010/0313166 A1* | 12/2010 | Nakayama | .......... | G06F 3/04817 715/810 |
| 2011/0138317 A1* | 6/2011 | Kang | ..................... | G06F 3/011 715/780 |
| 2011/0154213 A1* | 6/2011 | Wheatley | .............. | G06F 3/0481 715/738 |
| 2012/0266069 A1* | 10/2012 | Moshiri | ................ | G06F 3/0346 715/719 |
| 2013/0047087 A1* | 2/2013 | Yamahara | ......... | G06F 17/30053 715/727 |
| 2013/0269015 A1* | 10/2013 | Yamahara | ......... | G06F 17/30053 726/7 |

\* cited by examiner

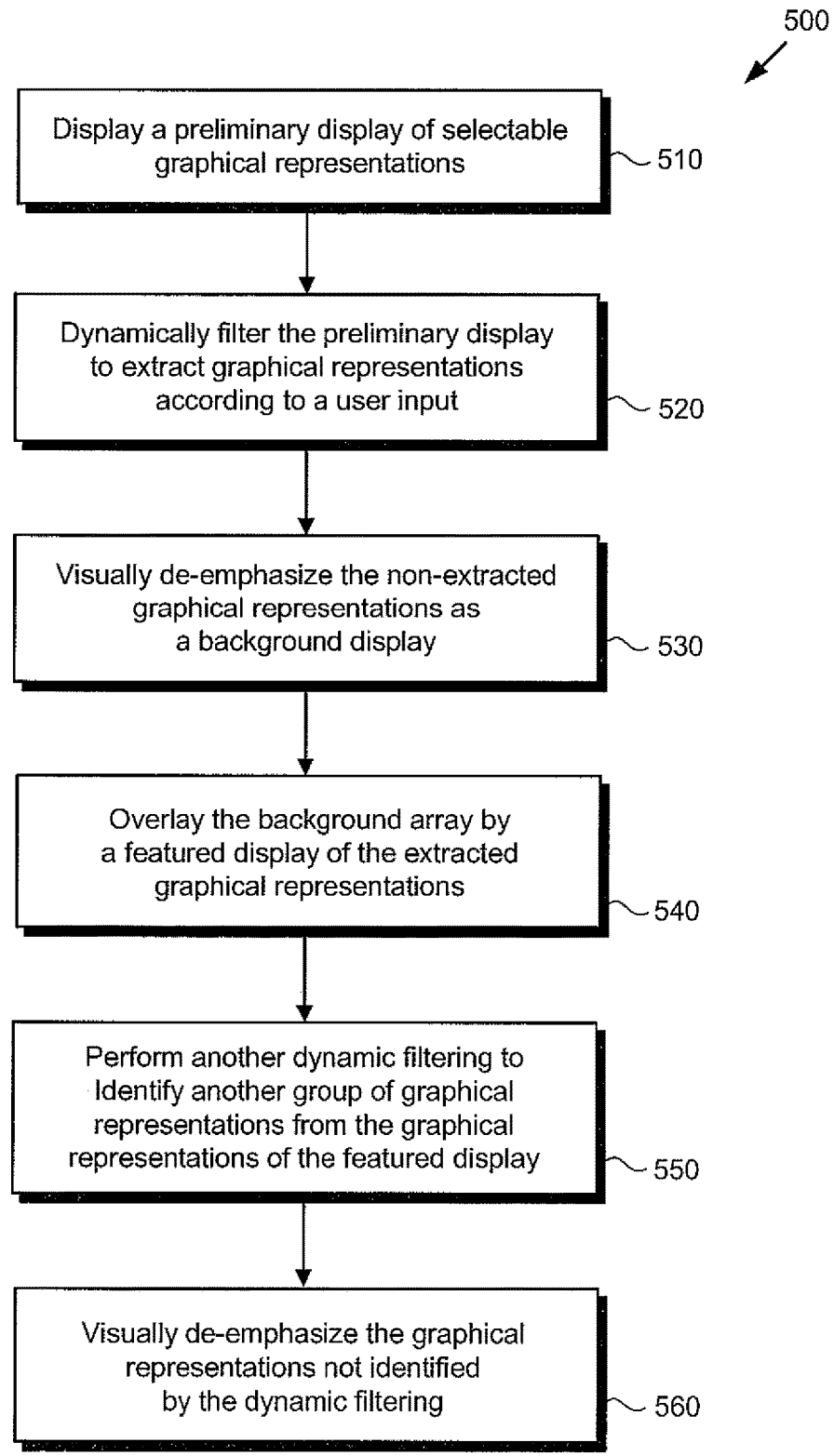

SYSTEM AND METHOD ENABLING VISUAL FILTERING OF CONTENT

RELATED APPLICATIONS

This application is a Continuation of U.S. application Ser. No. 12/931,702, filed Feb. 7, 2011, which claims priority to U.S. Provisional Application No. 61/397,455, filed on Jun. 11, 2010, which are hereby incorporated by reference in their entireties.

BACKGROUND OF THE INVENTION

1. Field of the Invention

The present invention relates generally to computerized searches. More particularly, the present invention relates to searching for media content.

2. Background Art

Locating content on the world wide web is at once both easier and more challenging for users than ever before. The search for web content is made easier by the vast and ever growing body of information available online. Whether a user is seeking music, television programming, videos, or movies, for example, information about that content, and in some instances digitized versions of the content itself, is likely to be available somewhere. At the same time, however, the search for web content has become more challenging in that isolating particularly desirable content may be more difficult because of the spectrum of alternatives competing for the user's attention. In other words, the availability of so much content so easily obtained may serve as a significant distraction, and may make it that much more unlikely that the user will quickly identify and locate content of genuine interest to them.

As a result, identifying and locating content of real interest can be a time consuming and frustrating experience for the user. Moreover, in some instances, the active efforts required to differentiate among alternative content items to distinguish those holding genuine interest for the user may undermine the pleasure otherwise obtainable from a more seamless and immediate identification of the desired content. For example, consider a user accessing an Internet database to search for movie content online. A conventional approach to enabling the user search typically relies upon standard computer based information management tools to sort and summarize content items of potential interest to the user. According to that approach, the user might be required to read or otherwise analyze a summary of available content items, categorized according to genre, subject matter, or other criteria, in order to locate a particular movie of interest.

While providing the user with some ability to discriminate among available content items according to broad themes, this conventional approach provides a relatively rudimentary means for discovering specific content of genuine interest. In other words, one significant disadvantage of this conventional approach is that unless the search strategy employed by the user is well thought out and targeted, the user may be presented with a multitude of content items to evaluate, many of which may be of only marginal relevance to the user's primary interest. Another significant disadvantage of this conventional approach is that it typically requires the user to engage individual content items in a deductive analytical process. For example, by requiring the user to read and absorb a digest or synopsis of the content items encountered in the search, the conventional approach imposes substantial burdens on the user's time and attention.

Accordingly, there is a need to overcome the drawbacks and deficiencies in the art by providing a solution enabling visual filtering of content so as to allow a user to engage and evaluate available content in an intuitive and enjoyable way.

SUMMARY OF THE INVENTION

There are provided systems and methods enabling visual filtering of content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 5 is a flowchart presenting a method for enabling visual filtering of content, according to one embodiment of the present invention.

DETAILED DESCRIPTION OF THE INVENTION

Figure 1:
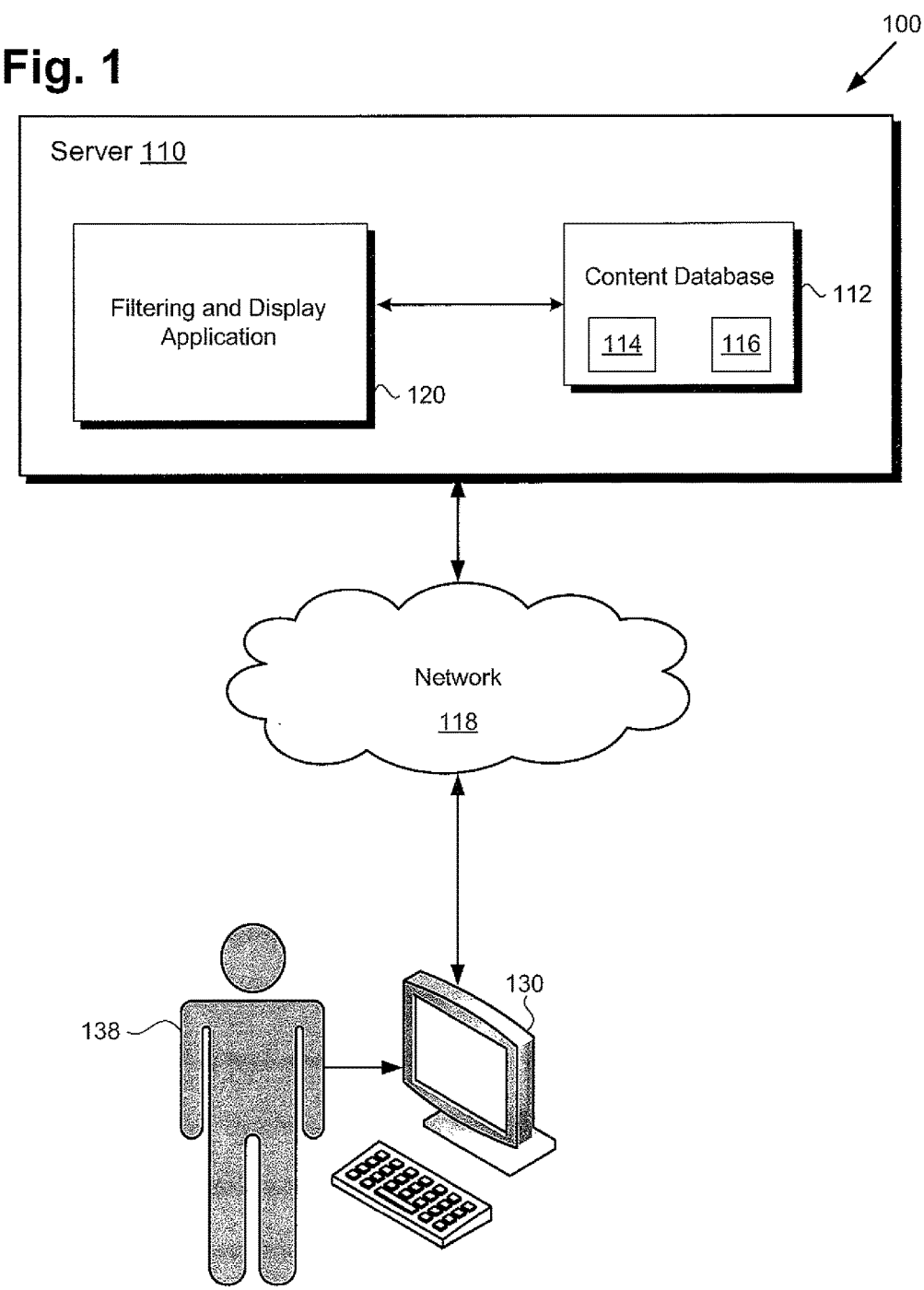
FIG. 1 shows a block diagram of a system enabling visual filtering of content, according to one embodiment of the present invention.

The present application is directed to a system and method enabling visual filtering of content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of system 100 enabling visual filtering of content, according to one embodiment of the present invention. In the embodiment of FIG. 1, system 100 comprises server 110 including content database 112 storing content units 114 and 116, filtering and display application 120, and a server controller (not shown). The server controller may be the central processing unit, for example, in which role the server controller runs the server computer operating system, and accesses and manipulates content database 112, and executes different programs and applications, such as filtering and display application 120. Also included in FIG. 1 are network 118, client computer 130, and user 138. It is noted that although client computer 130 is represented as a personal computer (PC) in FIG. 1, in other embodiments client computer 130 may comprise another type of mobile or stationary personal communication device or system, such as a tablet computer, mobile telephone, personal digital assistant (PDA), gaming console, or home entertainment system, for example.

According to the embodiment of FIG. 1, user 138 may utilize filtering and display application 120 to visually filter content available on content database 112, in order to intuitively and even enjoyably locate one or more desired content units, such as content units 114 and 116. Filtering and display application 120 may be configured to provide a user interface enabling user 138 to access desired content by viewing, sorting, and selecting one or more graphical representations corresponding respectively to content units 114 and 116. Filtering and display application 120 may utilize more than one visual display arrangement, and more than one combination of visually emphasized active graphical representations selectable by user 138 and visually de-emphasized inactive graphical representations not selectable by user 138, to enable user 138 to identify and select desired content, for example. That is to say, a collection of content units corresponding to audio-visual content including entertainment content such as books, feature films, or a television (TV) series or episode, for example, may be depicted by respective graphical representations and visually filtered in a dynamically responsive way using filtering and display application 120.

Various embodiments of the present invention allow user 138 to interact with data that is presented graphically rather than in text form on a media device, in order to filter the display characteristics of the graphically represented data based on filtering criteria. The filtering organizes search results for easy viewing. In one embodiment, filtering and display application 120 executing on a processor of client computer 130 provides user 138 with the ability to discover feature films or other audio-visual content using a graphical representation, such as key art or a thumbnail icon depicting the content. The graphical representations may be static or may comprise an audio-visual image, for example.

According to one embodiment, the graphical representations are visual depictions corresponding to a set of metadata representing content such as a book, movie, or TV programming. Such metadata may include the title of the content, actors or characters appearing in the content, an author, director, or creator of the content, a content description, or its runtime, rating, pricing, present or future availability, genre, and other information, for example.

In some embodiments, metadata may include timely information regarding the distribution window of the content. In the case of content in the form of a book, for example, the metadata may inform user 138 as to whether the book is available for purchase as a traditionally bound product, or for acquisition as an audio book or e-book available as a physical media and/or a digital media file. That is to say, in some embodiments, content database 112 may be updated according to one or more updating schedules to add and/or delete content units, as well as to modify metadata describing the content units as characteristics such as the distribution window, pricing, and availability of the content unit change over time. In one such embodiment, data used to update content database 112 may be sourced from server 110, while in another embodiment the update data may be sourced from one or more third party data providers (not shown in FIG. 1) and delivered to server 110 via network 118, for example. Alternatively, in some embodiments, system 100 may be configured so that update data may be sourced from server 110 as well as third party data providers.

For example, to enable visual filtering of a plurality of content units including content units 114 and 116, filtering and display application 120 may be configured to display a plurality of graphical representations corresponding to the plurality of content units including content units 114 and 116 in a preliminary display arranged in a grid pattern, or a graphical list view, for example, as active graphical representations selectable by user 138. In the event that user 138 were to discover content of interest by visual inspection of the preliminary display, user 138 can access metadata relevant to that content by selecting its respective graphical representation, such as by executing a mouse click or providing a touch-screen input to the display of client computer 130.

However, in the event that the desired content is not immediately discoverable by user 138 from the preliminary display, filtering and display application 120 can be configured to filter the plurality of graphical representations in order to extract a graphical representations from the preliminary display according to an input received from user 138, to display the graphical representations that were not extracted during the filtering in a visually de-emphasized background array, and to overlay the background array by a featured array displaying the subset of filtered graphical representations as active graphical representations selectable by user 138. Moreover, in one embodiment, filtering and display application 120 may be configured to perform additional filtering and display operations dynamically, in response to one or more additional inputs received from the user.

In one embodiment, filtering and display application 120 may identify the preliminary display independently of a real-time input from the user. For example, filtering and display application 120 may extract a subset of the graphical images corresponding to the plurality of content units including content units 114 and 116 according to historical data associated with user 138, such as previous content unit selections of user 138 available as history data, or according to preferences previously identified by user 138, for example.

As shown in FIG. 1, filtering and display application 120 may be accessed through network 118. In that instance, filtering and display application 120 may comprise a web application, accessible over a packet network such as the Internet, and configured to execute as a server based application on server 110, for example. Alternatively, filtering and display application 120 may reside on a server supporting a local area network (LAN), or be included in another type of limited distribution network. In another embodiment, filtering and display application 120 may be stored on a computer-readable storage medium such as a computer hard-drive, computer based random-access memory (RAM), or a portable memory device such as a compact disc read-only memory (CD-ROM) or external Universal Serial Bus (USB) connected memory, for example.

Figure 2:
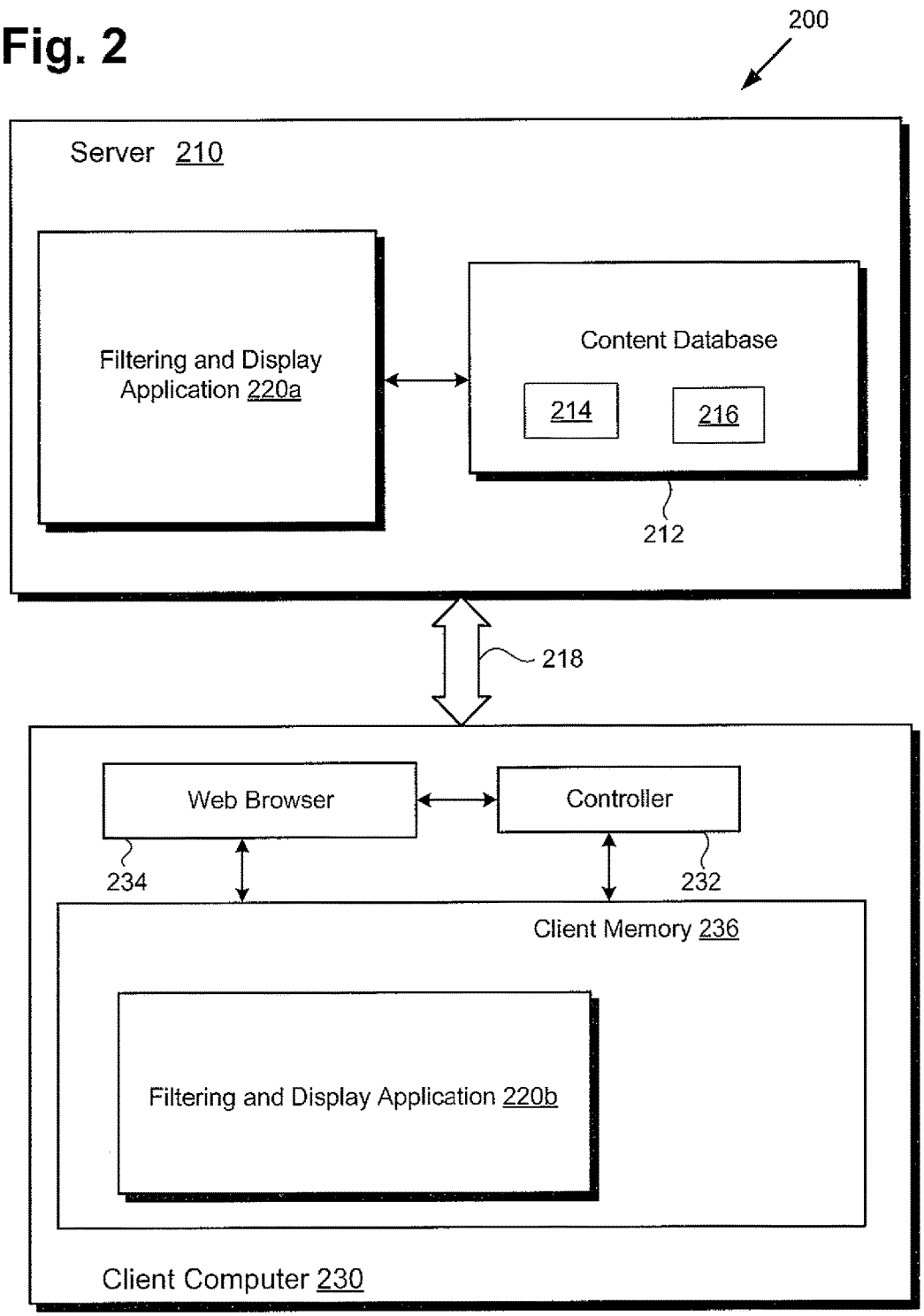
FIG. 2 shows a more detailed embodiment of a system enabling visual filtering of content, according to one embodiment of the present invention.

Turning now to FIG. 2, FIG. 2 shows a more detailed embodiment of system 200 enabling visual filtering of content, according to one embodiment of the present invention. System 200 in FIG. 2 includes client computer 230, receiving a download via communication link 218 from server 210. Server 210 is shown to comprise content database 212 including content units 214 and 216, and filtering and display application 220*a*. Server 210, content database 212 including content units 214 and 216, and filtering and display application 220*a*, in FIG. 2, correspond respectively to server 110, content database 112 including content units 114 and 116, and filtering and display application 120, in FIG. 1. Moreover, client computer 230, in FIG. 2, corresponds to client computer 130, in FIG. 1. As shown in FIG. 2, client computer 230 comprises controller 232, web browser 234, and client memory 236. Also shown in FIG. 2 is filtering and display application 220*b*.

According to the embodiment shown in FIG. 2, filtering and display application 220*b* is located in client memory 236, having been received from server 210 via communication link 218. In the present embodiment, communication link 218 represents download of filtering and display application 220*a*, over a network such as network 118 in FIG. 1, for example. In another embodiment, communication link 218 may represent transfer of filtering and display application 220*a* from a CD-ROM or other computer-readable storage medium. Once transferred, filtering and display application 220*b* may be stored in client memory 236 and executed locally on client computer 230, as a desktop application, for example. It is noted that communication link 218 is shown as a two-way communication, to represent ongoing communication between client computer 230 and content database 212 on server 210.

Controller 232 may be the central processing unit for client computer 230, for example, in which role controller 232 runs the client computer operating system, launches web browser 234, and facilitates use of filtering and display application 220*b*. Web browser 234, under the control of controller 232, may execute filtering and display application 220*b* to enable visual filtering of content stored on content database 212.

The systems shown in FIG. 1 and FIG. 2 may be used to enable a user to visually filter content so as to identify one or more items of desired content. Various embodiments of the present invention providing that functionality will now be further described by reference to FIGS. 3A, 3B, 3C, and 3D (hereinafter "FIGS. 3A-3D"), and FIGS. 4 and 5, in addition to the systems embodied by FIGS. 1 and 2, FIGS. 3A-3D show respective visual frames 300A-300D, on which are captured respective exemplary displays of graphical representations corresponding to content units selectable by user 138, according to embodiments of the present invention. FIG. 4 shows visual frame 400, on which is captured a portion of an exemplary featured display of graphical representations extracted from a preliminary inventory display, according to one embodiment of the present invention. Visual frames 300A-300D and 400 may be displayed on either or both of client computers 130 and 230, shown in respective FIGS. 1 and 2. It is noted that although for clarity of presentation, portions of the following description focus on one or the other of the systems shown by FIGS. 1 and 2, both systems are capable of enabling visual filtering of content in the manner described.

FIG. 5 shows flowchart 500 describing the steps, according to one embodiment of the present invention, of a method for enabling visual filtering of content. Certain details and features have been left out of flowchart 500 that are apparent to a person of ordinary skill in the art. For example, a step may comprise one or more substeps or may involve specialized equipment or materials, as known in the art. While steps 510 through 560 indicated in flowchart 500 are sufficient to describe one embodiment of the present method, other embodiments may utilize steps different from those shown in flowchart 500, or may include more, or fewer steps.

Figure 3A:
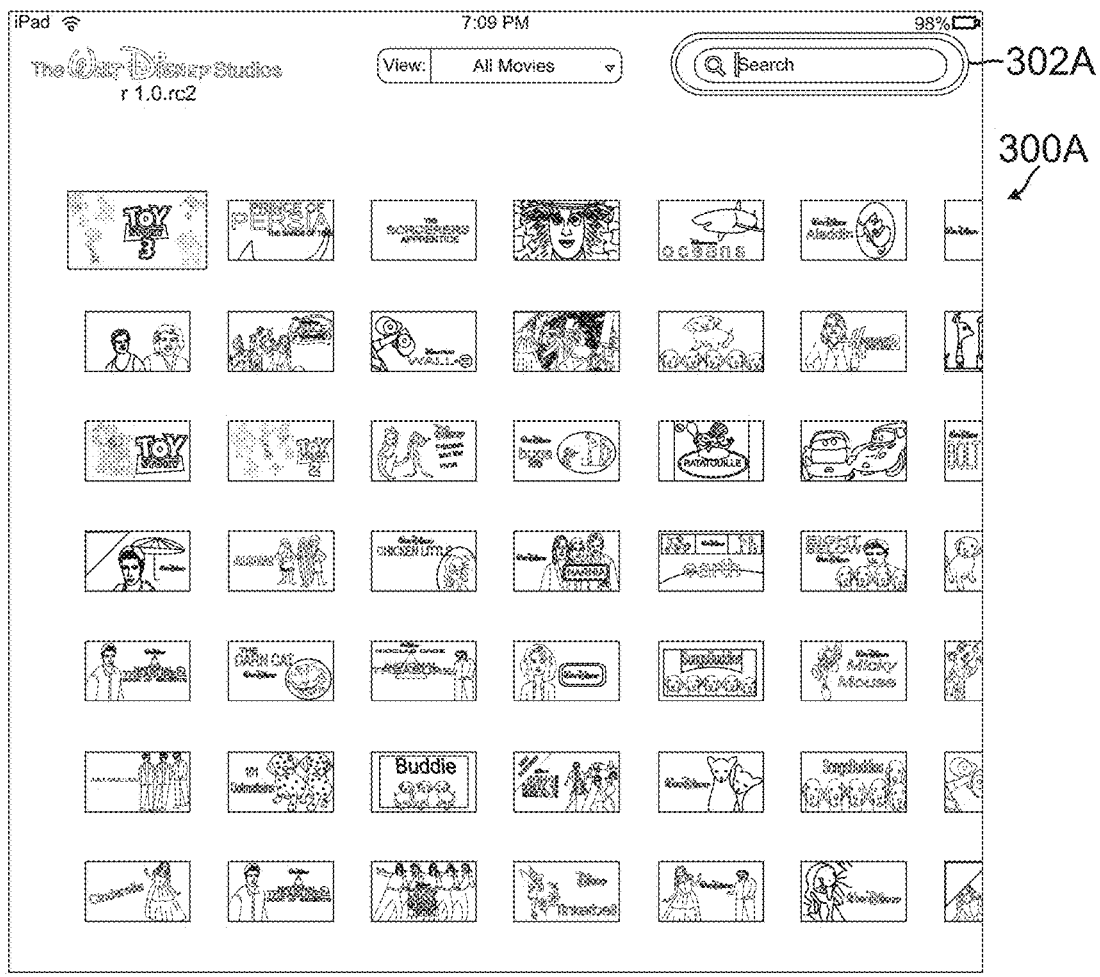
FIG. 3A shows a visual frame on which is captured a portion of an exemplary preliminary display of graphical representations corresponding to content units selectable by a user, according to one embodiment of the present invention.
Figure 4:
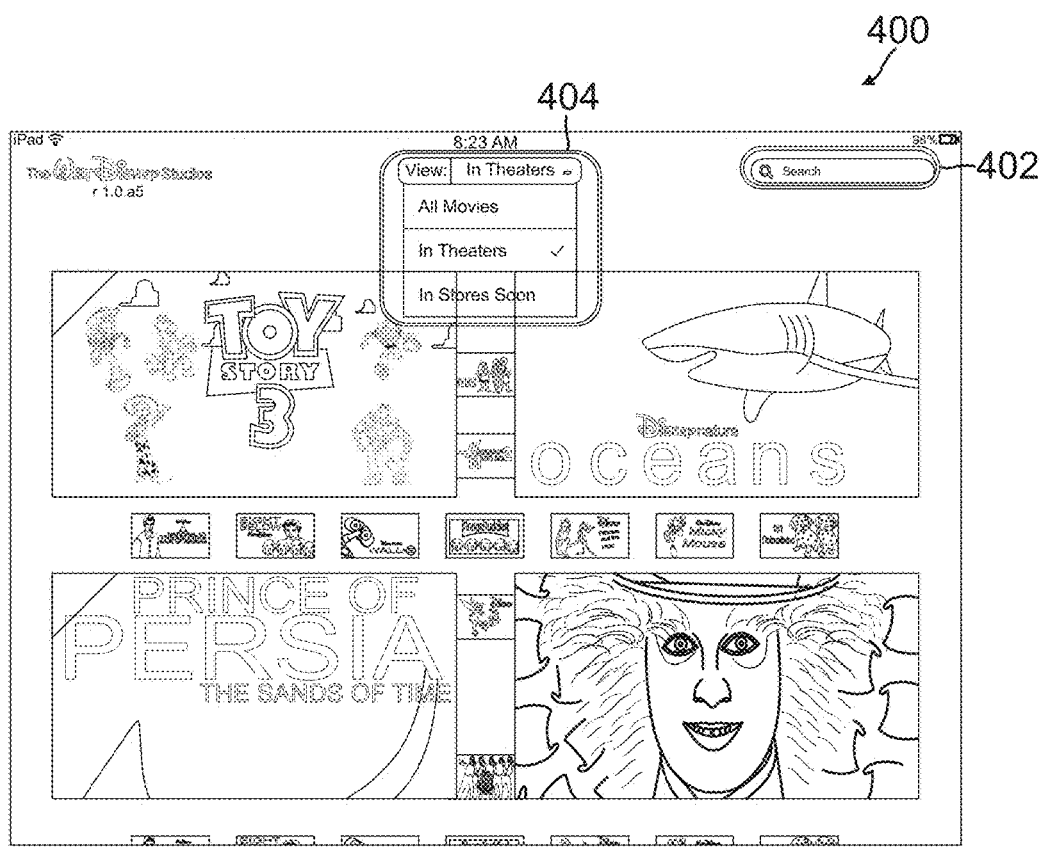
FIG. 4 shows a visual frame on which is captured a portion of a fourth exemplary featured display of graphical representations, according to one embodiment of the present invention.

Referring to step 510 of flowchart 500 in conjunction with FIGS. 1, 2, and 3A, step 510 comprises displaying a preliminary array of selectable graphical representations. Step 510 may be performed by filtering and display application 120, 220*a*, or 220*b*, and may include displaying a first plurality of graphical representations corresponding to content units stored by content database 112 or 212 in an inventory array as active graphical representations selectable by user 138. As a specific example, let us consider content units, e.g., content units 114 and 116 or 214 and 216, as corresponding respectively to feature films in various stages of commercial distribution. In addition, the present example will depict those feature films using static images arranged in a preliminary inventory array, as shown by visual frame 300A, in FIG. 3A.

The graphical representations can be arranged in any number of ways on a display device, such as a computer screen, for example, but in the specific examples discussed at present, the graphical representations are displayed in a grid pattern. Alternative embodiments may utilize, for example, a graphical list view, a three-dimensional graphical interface displaying images analogous to Cover Flow art, a tabbed interface, or any other presentation interface. In addition, it is noted that although FIGS. 3A-3D and FIG. 4 depict the graphical representations as static images, in other embodiments, some or all of the graphical representations appearing in FIGS. 3A-3D and FIG. 4 may include audio-visual images.

According to the embodiment represented by FIG. 3A, the dimensions of the preliminary inventory array are larger than the display area of visual frame 300A, so that only a portion of the inventory array is visible at any given time in the visual frame. In some embodiments, filtering and display application 120, 220*a*, or 220*b* is configured to arrange the inventory array according to a priority ordering of the graphical representations, to ensure that high priority items are displayed in the center of the array, with lower priority items radiating outward from the center, for example. To promote specific content, e.g., high priority feature films, beyond this default priority, filtering and display application 120, 220*a*, or 220*b* can be further configured to add additional emphasis to one or more graphical representations, such as causing those graphical representations to appear, for example, larger than other graphical representations displayed as part of the inventory array.

An example of visual filtering is demonstrated in FIGS. 3A through 3D. At FIG. 3A, no user input has been entered into search box 302*a* by user 138. As a result, visual frame 300B displays a default inventory array. As previously described, the ordering of the graphical representations within the inventory array may be based on a particular metadata priority order, with graphical representations corresponding to high priority content being displayed either centrally within the inventory display, and/or having a larger or more prominent appearance compared with graphical representations corresponding to lower priority content.

Figure 3B:
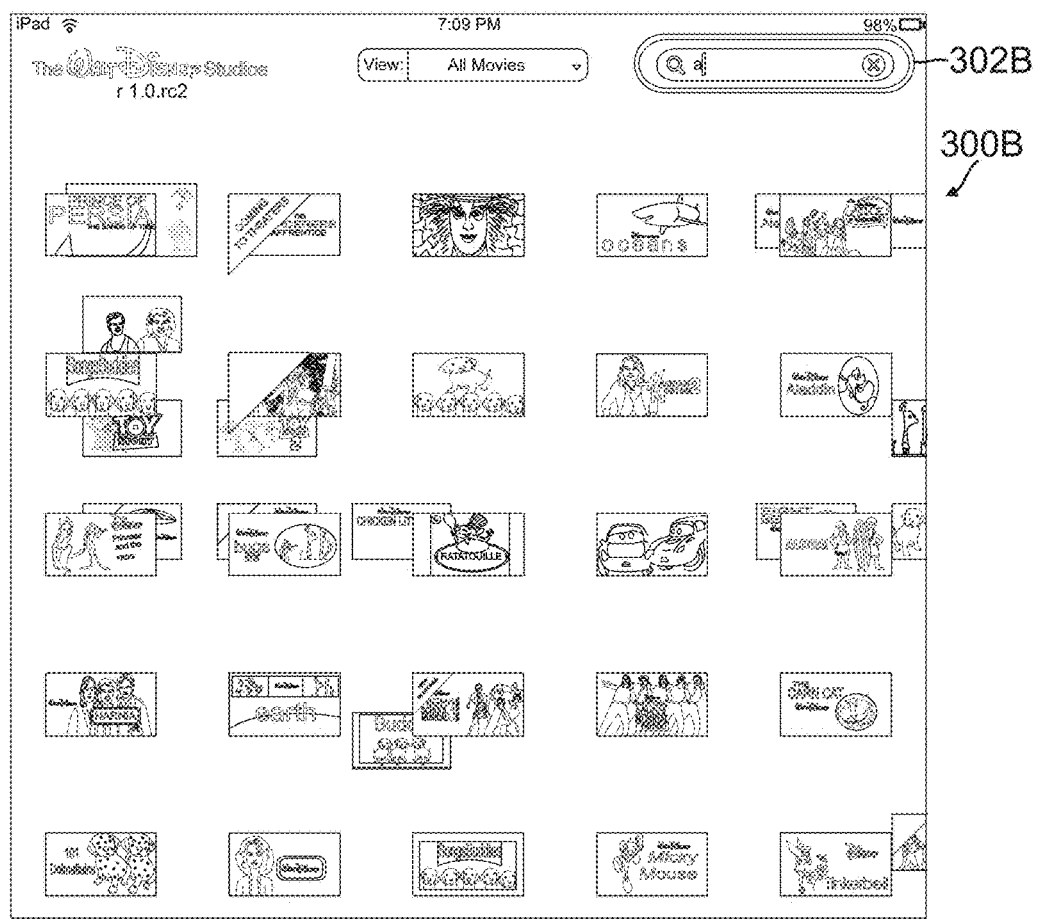
FIG. 3B shows a visual frame on which is captured a portion of an exemplary featured display of graphical representations extracted from the preliminary display of FIG. 3A according to an input received from the user, according to one embodiment of the present invention.

The method of flowchart 500 continues with step 520, which comprises dynamically filtering the preliminary inventory array shown by visual frame 300A to extract a subset of the graphical representations according to a user input. Step 520 may be performed by filtering and display application 120, 220a, or 220b, for example, in response to an input received from user 138. Referring to FIG. 3B, for example, user 138 may have entered the letter "a" so that the search criterion in search box 302b now reads "a". According to the present example, filtering and display application 120, 220a, or 220b is configured to filter the content units stored in content database 112 or 212 according to metadata including the feature film title. Consequently, entry of the letter "a" in search box 302b causes filtering and display application 120, 220a, or 220b to extract all graphical representations corresponding to content units having the letter "a" in their titles from the inventory array shown in FIG. 3A. In other words, filtering and display application 120, 220a, or 220b may be configured to dynamically filter the available content and to replace a previous display of graphical representations with an updated or modified display according to each letter or other integral unit of search data received from the user.

In one embodiment, the present method may begin with step 520, rather than step 510. In that embodiment, user 138 may initially be provided with a substantially unpopulated display including a search field, drop down menu, or other suitable interface for inputting filtering criteria. Filtering and display application 120, 220a, or 220b may then respond to an input received from the user by dynamically filtering the content units available on content database 112 in order to display selectable graphical representations of only those content units corresponding to the received filtering criteria.

According to the present embodiment, flowchart 500 continues with step 530, comprising visually de-emphasizing the non-extracted graphical representations as a background array. According to the specific example implementation, step 530 includes displaying those graphical representations included in the preliminary inventory array of FIG. 3A and corresponding to content units omitting the letter "a" from their titles, in a visually de-emphasized background display, also shown as an array in the present figures. Once again, step 530 can be performed by filtering and display application 120, 220a, or 220b. Visually de-emphasizing the background display may take one or more of several forms. For example, the background display may appear to include visually faded and/or monochromatically colored graphical representations. Moreover, in one embodiment, visually de-emphasizing the background display comprises presenting the background display as inactive graphical representations not selectable by user 138. In other words, in that latter embodiment, user 138 is unable to access metadata relevant to the content corresponding to graphical representations in the background display by mouse clicking on or otherwise attempting to select the image.

Moving on to step 540 of flowchart 500, step 540 comprises overlaying the background display by a featured display of the extracted graphical representations. Step 540 may be performed by filtering and display application 120, 220a, or 220b, for example, and may comprise overlaying the visually de-emphasized background display of step 530 by a featured display presenting the subset of graphical representations extracted in the filtering of step 520 as active graphical representations selectable by user 138. For example, in one embodiment, step 540 may include enlarging the extracted or "featured" graphical representations relative to the graphical representations comprised by the background array.

Referring again to FIG. 3B, visual frame 300B shows the results of performing steps 520 through 540 of flowchart 500. For example, as previously explained, user 138 may have typed in the letter "a" so that the search criterion in search box 302b now reads "a", and filtering and display application 120, 220a, or 220b executes steps 520 through 540 to feature graphical representations corresponding to content units including the letter "a" in their metadata feature film titles. Notice that the background display of step 530 is visually de-emphasized by having its grid pattern recede into the display background of visual frame 300B, while the featured display of step 540 is overlaid using enlarged graphical representations made prominent within visual frame 300B. While the examples shown in FIGS. 3A and 3B display the results by having foreground clustering overlying a background grid array, alternative embodiments of the present method may use alternative display modes to present the visual filtering results. Because the search criterion "a" is rather broad, too many results may be obtained in visual frame 300B for successful identification of desired content.

Figure 3C:
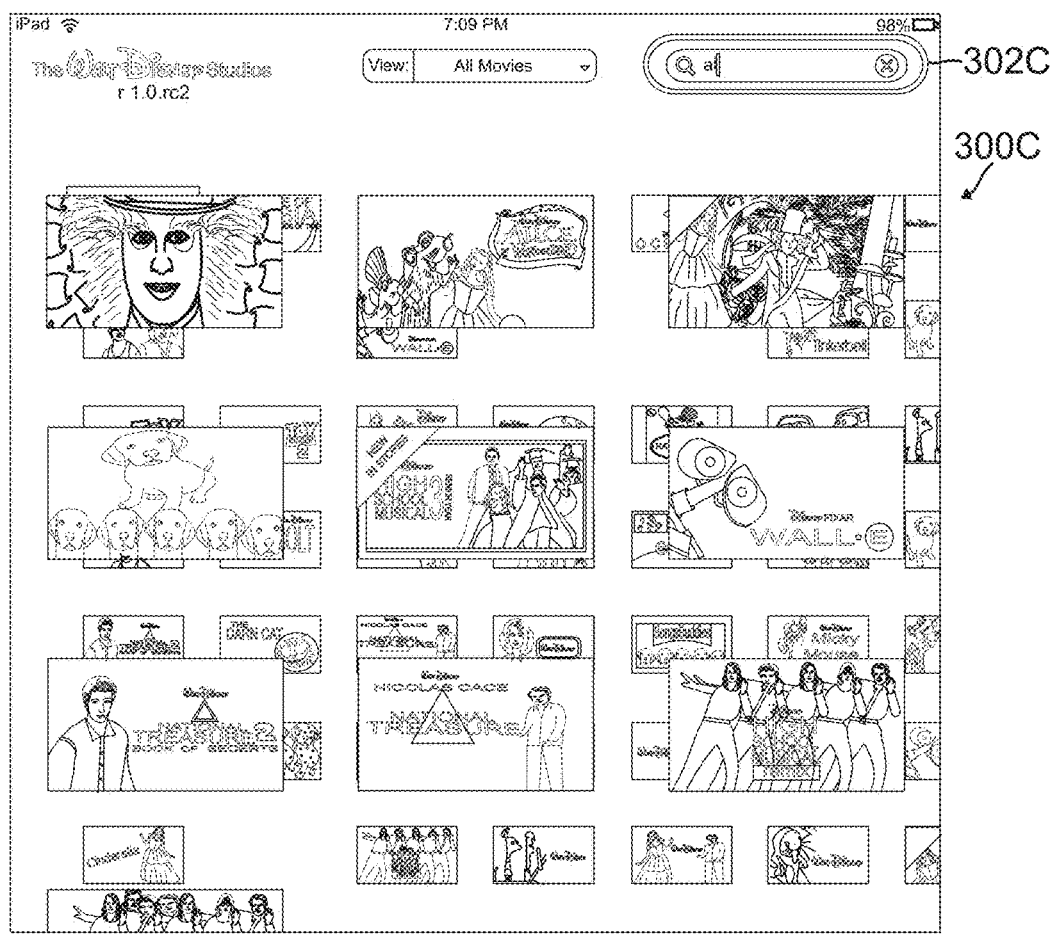
FIG. 3C shows a visual frame on which is captured a portion of a second exemplary featured display of graphical representations, according to one embodiment of the present invention.
Figure 3D:
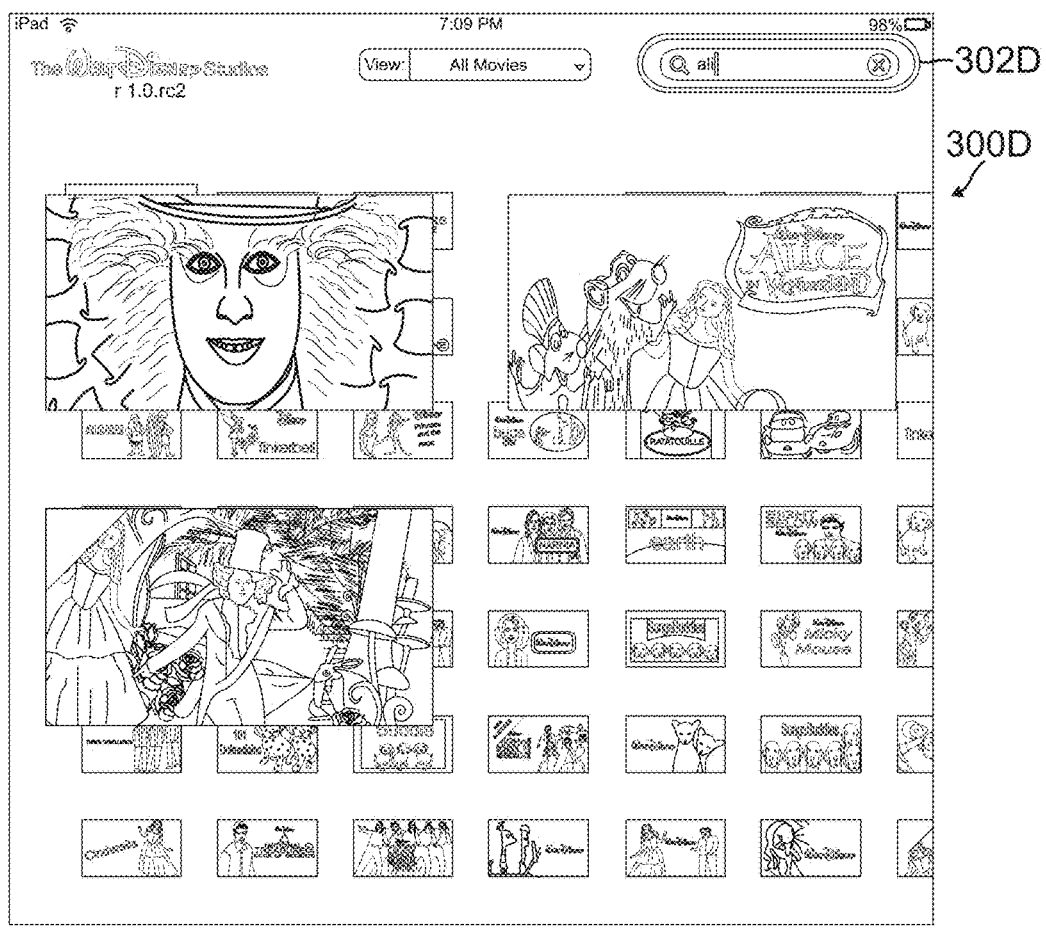
FIG. 3D shows a visual frame on which is captured a portion of a third exemplary featured display of graphical representations, according to one embodiment of the present invention.

Steps 550 and 560 of flowchart 500 perform operations on the graphical representation of the featured display of step 540 analogous to steps 520 and 530 as applied to the preliminary inventory array of step 510. That is to say, in order to further refine the visual filtering of the content units available in content database 112 or 212, step 550 comprises performing another dynamic filtering to identify another subset of graphical representations from the featured display according to another input by user 138. Referring to FIG. 3C, according to the present example, user 138 has continued by entering the letter "l" into search box 302c, so that the search criteria now comprises the letter combination "al". Step 550, performed by filtering and display application 120, 220a, or 220b, results in identification of graphical representations corresponding to the content units including the combination "al" in their feature film titles, from among the graphical representations of the featured display shown in FIG. 3B.

In step 560 of flowchart 500, again performed by filtering and display application 120, 220a, or 220b, those graphical representations not identified by the dynamic filtering of step 550 are visually de-emphasized. As may be apparent from visual frame 300C, in FIG. 3C, visually de-emphasizing the not identified graphical representations in step 560 can comprise moving those graphical representations from the featured display to the background display. Moreover, in one embodiment, visually de-emphasizing the not identified graphical representations can comprise reducing the size of those graphical representations and displaying those graphical representations as inactive graphical representations not selectable by user 138.

Step 560 may be followed by additional iterations corresponding to steps 550 and 560 according to additional inputs provided by user 138. For example, referring to visual frame 300D in FIG. 3D, user 138 may continue by entering the letter "i" so that the search box 302d now includes the letter combination "ali". As a result, there are only three graphical representations remaining as featured graphical representations in visual frame 350D, and all are related to the feature film "Alice in Wonderland". Advantageously, because the visual filtering may be dynamically updated as user 138 provides additional inputs into search box 302d, user 138 is not required to provide any additional entries as filtering criteria, and can simply select the desired feature film from the selections provided. While text entry is one method of providing a filtering inputs, alternative embodiments may use alternative input methods, such as for example, touch sensing, or voice recognition using a microphone. Moreover, while the example of visual filtering has only matched to the title of the content in the present example, the visual filtering may also be configured to match against other metadata such as, for example, actors, year or decade of release, ratings, distribution window, pricing, present or future availability, genre, and other criteria.

Turning now to FIG. 4, FIG. 4 shows visual frame 400, wherein visual filtering is performed based on an alternative search criteria tied to the distribution window of the corresponding content, for example, whether the feature film is available as an "in theater" product, or available for licensing or purchase, as either digital content or as a physical media, for example. As shown by filter selector 404, the perspective of visual frame 400 is changed from the default "All Movies" utilized in visual frames 300A-300D, to the selection "In Theaters". Because search box 402 is empty in visual frame 400, the search query returns all movies but is further filtered to return only those movies having the "In Theater" window metadata attribute positively set. Consequently, all media selections that are presently showing in theaters as indicated by associated metadata are displayed in visual frame 400. In the specific example shown in FIG. 4, the resulting featured display includes "Toy Story 3", "Oceans", "Prince of Persia", and "Alice in Wonderland" and overlays a visually de-emphasized background display including movies not presently viewable in theaters.

Thus, filtering can occur based on user input, such as a search query, or based on criteria selectable by the user, as shown by filter selector 404. Other selectable criteria may include distribution window, pricing, present or future availability, genres, formats, retailers, theaters, location, and other criteria. The selectable criteria may be provided to the user through preset filters, as shown by filter selector 404, or the user may be able to create their own set of user defined metadata filters. In this manner, the user can flexibly search, display, and visually navigate through a wide range of media or other content in an intuitive graphical display format, rather than through a conventional text-based display format.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a system for enabling visual filtering of content, the method comprising:
   filtering a plurality of graphical representations corresponding to a plurality of content units stored by the system, to extract a subset of the plurality of graphical representations for displaying to a user;
   displaying the subset of the plurality of graphical representations as first active graphical representations selectable by the user; and
   receiving a plurality of new search letters inputted by the user, wherein for each of said plurality of new search letters inputted by the user, the method further comprises:
      providing a combination of each of said plurality of new search letters with any one or more of the plurality of search letters previously inputted by the user;
      dynamically filtering the subset of the plurality of graphical representations to filter out one or more graphical representations based on said combination; and
      altering, in response to the dynamically filtering, the first active graphical representations to exclude the one or more graphical representations from the subset of the active graphical representations to continue displaying second active graphical representations selectable by the user;
      wherein at least one of the one or more graphical representations excluded by the dynamically filtering are displayed but not selectable by the user.

2. The method of claim 1, wherein at least one of the filtering and the dynamic filtering is performed according to a future availability of the content to which each content unit respectively corresponds.

3. The method of claim 1, wherein at least one of the first active graphical representations and the second active graphical representations comprises a graphical list view.

4. The method of claim 1, wherein at least one of the first active graphical representations and the second active graphical representations comprises a graphical array.

5. The method of claim 1, wherein the filtering of the plurality of graphical representations to extract the subset of the plurality of graphical representations for displaying to the user is performed according to one of history data and preference data, the one of the history data and the preference data being associated with the user.

6. The method of claim 1, wherein at least one of the plurality of graphical representations and the subset of the graphical representations comprises audio-visual images.

7. The method of claim 1, wherein at least one of the filtering and the dynamic filtering is performed according to a metadata associated with each of the respective graphical representations.

8. The method of claim 1, wherein at least one of the filtering and the dynamic filtering is performed according to a metadata associated with each of the respective graphical representations, the metadata sourced from the system.

9. The method of claim 1, wherein at least one of the filtering and the dynamic filtering is performed according to a distribution window of the content to which each content unit respectively corresponds.

10. A system enabling visual filtering of content, the system comprising:
   a server having a non-transitory storage medium;
   a content database accessible through the server, the content database storing a plurality of content units;
   a filtering and display application stored in the non-transitory storage medium and configured to enable visual filtering of the plurality of content units, by:
      filtering a plurality of graphical representations corresponding to a plurality of content units stored by the system to extract a subset of the plurality of graphical representations for displaying to a user;

displaying the subset of the plurality of graphical representations as first active graphical representations selectable by the user; and receiving a plurality of new search letters inputted by the user, wherein for each of said plurality of new search letters inputted by the user, the method further comprises:

providing a combination of each of said plurality of new search letters with any one or more of the plurality of search letters previously inputted by the user;

dynamically filtering the subset of the plurality of graphical representations to filter out one or more graphical representations based on said combination; and altering, in response to the dynamically filtering, the first active graphical representations to exclude the one or more graphical representations from the subset of the active graphical representations to continue displaying second active graphical representations selectable by the user;

wherein at least one of the one or more graphical representations excluded by the dynamically filtering are displayed but not selectable by the user.

11. The system of claim 10, wherein at least one of the filtering and the dynamic filtering is performed according to a future availability of the content to which each content unit respectively corresponds.

12. The system of claim 10, wherein at least one of the first active graphical representations and the second active graphical representations comprises a graphical list view.

13. The system of claim 10, wherein at least one of the first active graphical representations and the second active graphical representations comprises a graphical array.

14. The system of claim 10, wherein the filtering of the plurality of graphical representations to extract the subset of the plurality of graphical representations for displaying to the user is performed according to one of history data and preference data, the one of the history data and the preference data being associated with the user.

15. The system of claim 10, wherein at least one of the plurality of graphical representations and the subset of the graphical representations comprises audio-visual images.

16. The system of claim 10, wherein at least one of the filtering and the dynamic filtering is performed according to a metadata associated with each of the respective graphical representations.

17. The system of claim 10, wherein at least one of the filtering and the dynamic filtering is performed according to a metadata associated with each of the respective graphical representations, the metadata sourced from the system.

18. The system of claim 10, wherein at least one of the filtering and the dynamic filtering is performed according to a distribution window of the content to which each content unit respectively corresponds.

* * * * *